United States Patent [19]
Harrison

[11] Patent Number: 5,640,748
[45] Date of Patent: Jun. 24, 1997

[54] PIPELINE ASSEMBLING APPARATUS FOR USE WITH LARGE DIAMETER PIPES

[76] Inventor: Richard L. Harrison, 17918 Pine Cone Dr., Redding, Calif. 96003

[21] Appl. No.: 585,804

[22] Filed: Jan. 16, 1996

[51] Int. Cl.$^6$ ................................................. B25B 27/14
[52] U.S. Cl. .................. 29/272; 29/237; 29/267; 29/280; 254/29 R
[58] Field of Search ............................. 29/237, 267, 280, 29/282; 254/29 R; 269/43

[56] References Cited

U.S. PATENT DOCUMENTS

| | | | |
|---|---|---|---|
| 1,615,008 | 1/1927 | Ferguson | 254/29 R |
| 2,958,125 | 11/1960 | Nichols | 254/29 R |
| 3,281,929 | 11/1966 | Shinnick | 29/237 |
| 3,373,477 | 3/1968 | Markgraf | 29/237 |
| 3,653,115 | 4/1972 | Perkins | 269/43 |
| 3,797,094 | 3/1974 | Combs et al. | 29/237 |
| 4,178,668 | 12/1979 | George | 29/237 |
| 4,519,122 | 5/1985 | Miller | 29/237 |
| 4,598,452 | 7/1986 | Iseki | 29/237 |
| 5,226,231 | 7/1993 | De Leebeeck | 29/237 |

FOREIGN PATENT DOCUMENTS

3511041-C 9/1986 Germany.

*Primary Examiner*—Timothy V. Eley
*Assistant Examiner*—Lee Wilson
*Attorney, Agent, or Firm*—John R. Flanagan

[57] ABSTRACT

A pipeline assembling apparatus used in assembling together large diameter PVC pipes into a pipeline includes a gripper assembly having an upright member for placement adjacent a side of an end of a second pipe to be inserted into an adjacent end of a first pipe and a pair of upper and lower horizontal members extending in cantilevered fashion outwardly from the upright member and generally parallel to one another for placement respectively above and below the end of the second pipe, an actuator assembly spaced from the gripper assembly and having a lower yoke of an inverted U-shape formed by a top horizontal member and a pair of vertical side members for placement over the end of the first pipe and a handle fixedly attached to the top horizontal member of the lower yoke, and a link member extending between and pivotally connected at one end to the upper horizontal member of the gripper assembly and at an opposite end to the handle of the actuator assembly such that by manually pulling on an upper extension of the handle in a direction away from the second pipe the end of the second pipe is gripped between the upper and lower horizontal members of the gripper assembly and the second pipe is pulled with the gripper assembly toward and guidably inserted into the adjacent stationary end of the first pipe.

20 Claims, 2 Drawing Sheets

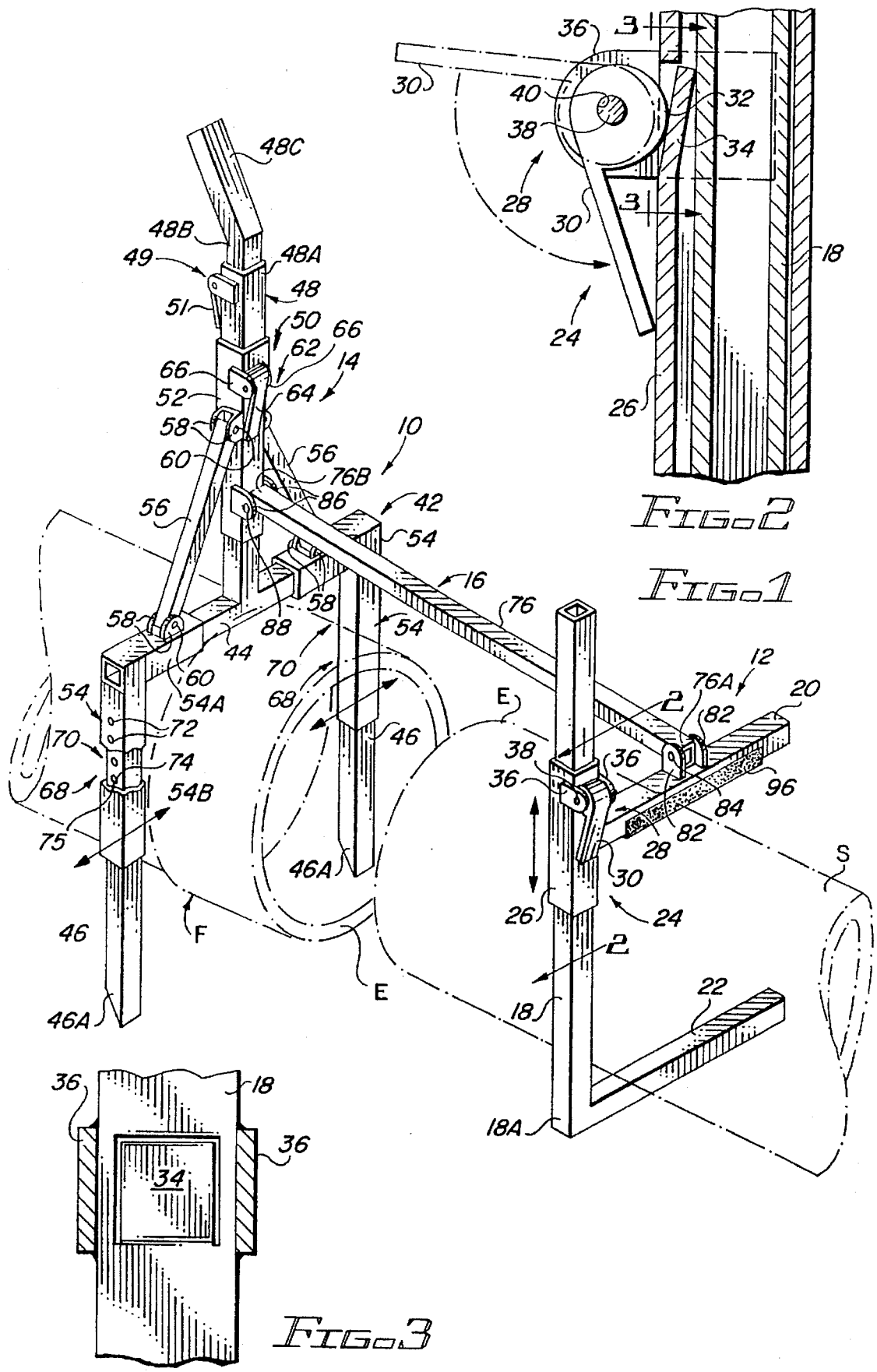

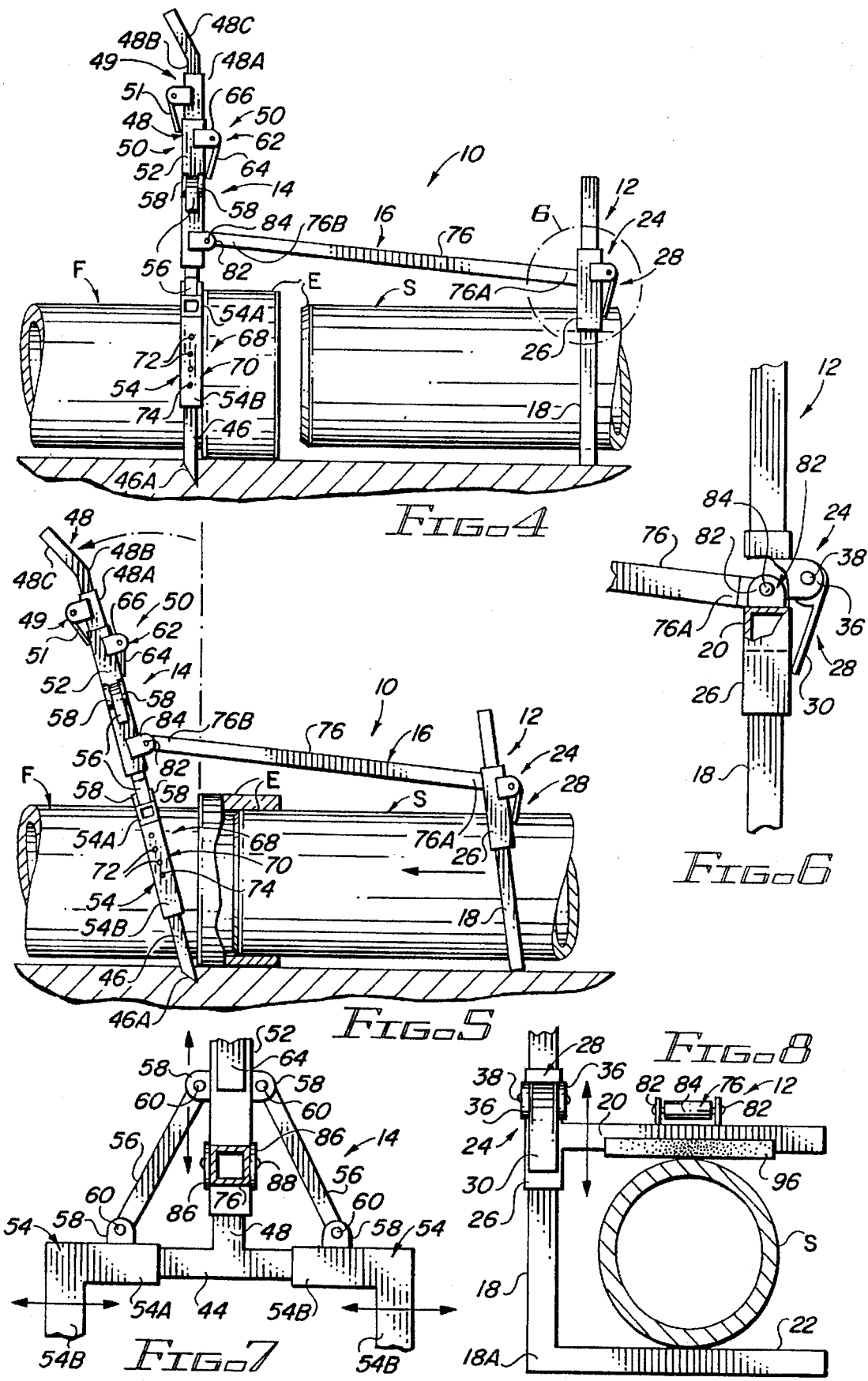

PIPELINE ASSEMBLING APPARATUS FOR USE WITH LARGE DIAMETER PIPES

BACKGROUND OF THE INVENTION

1. Field of the Invention

The present invention generally relates to the assembly of pipelines and, more particularly, is concerned with an apparatus adapted especially for use in assembling together large diameter pipes, such as PVC pipes, into a pipeline.

2. Description of the Prior Art

The assembling of pipelines which have large diameter pipes such as those used for water mains and gas or sewer lines commonly requires the efforts of at least two and often more people in a trench using pry bars, backhoes and other tools. The reason for this lies in the fact that these pipes are normally twenty feet in length and generally have an average weight of 66 pounds for a four inch diameter pipe to 503 pounds for a twelve inch diameter pipe. A pipe having a diameter of at least four inches is considered a large diameter pipe. The assembly of these pipes into a pipeline occurs by insertion of a tapered end of one pipe section into a seal containing bell opening in an adjacent pipe section.

A variety of devices have been developed over the years which attempt to provide a means for assembling pipelines which have these large diameter pipes and other types of pipes. Representative examples of these devices are disclosed in U.S. Pat. No. 2,958,125 to Nichols, U.S. Pat. No. 3,281,929 to Shinnick, U.S. Pat. No. 3,373,477 to Markgraf, U.S. Pat. No. 3,653,115 to Perkins, U.S. Pat. No. 3,797,094 to Combs et al., U.S. Pat. No. 4,178,668 to George, U.S. Pat. No. 4,519,122 to Miller, U.S. Pat. No. 4,598,452 to Iseki, U.S. Pat. No. 5,226,231 to De Leebeeck and German Pat. No. DE 3511-041-C to Minkmar. Although each of these devices may function satisfactorily under the limited range of conditions for which it was designed, it is perceived by the inventor of the present invention that none of these devices are satisfactory in terms of the performance requirements of functionality, durability, simplicity and ease of use in assembling pipelines having large diameter pipes.

Consequently, a need still exists for an apparatus which will satisfy the aforementioned performance requirements in assembling pipelines employing large diameter pipes without also introducing any obstacles.

SUMMARY OF THE INVENTION

The present invention provides a pipeline assembling apparatus designed to satisfy the aforementioned need. The pipeline assembling apparatus of the present invention is particularly intended for use with large diameter pipes such as those used in the installation of water mains and gas or sewer lines. The pipeline assembling apparatus is generally constructed of a plurality of sections of rigid square tubing of durable material, such as steel, which are welded and linked together to form an apparatus which provides sufficient leverage to force two pipe sections together in the assembling of a pipeline. The various components of the apparatus used to make adjustments thereto are easily accessible, efficient and workable and thereby make the apparatus readily adaptable for use especially with large pipes having diameters, for example, ranging generally from four to fourteen inches.

Accordingly, the present invention is directed to a pipeline assembling apparatus for use in assembling together large diameter pipes into a pipeline. The pipeline assembling apparatus comprises: (a) a gripper assembly including an upright member for placement adjacent to a side of the end of a second pipe to be inserted into an end of a first pipe and a pair of upper and lower horizontal members extending in a cantilevered manner outwardly from the upright member and generally parallel to one another for placement respectively above and below the end of the second pipe; (b) an actuator assembly spaced from the gripper assembly and including a lower yoke of an inverted U-shape formed by a top horizontal member and a pair of vertical side members for placement over the end of the first pipe, and a handle fixedly attached to the top horizontal member of the lower yoke; and (c) link means extending between and pivotally connected at one end to the upper horizontal member of the gripper assembly and at an opposite end to the handle of the actuator assembly such that by manually pulling on the handle in a direction away from the second pipe the end of the second pipe is gripped between the upper and lower horizontal members of the gripper assembly and the second pipe is pulled with the gripper assembly toward and guidably inserted into the adjacent stationary end of the first pipe.

The gripper assembly further includes side means for adjusting the height of the upper horizontal member along the upright member and relative to the lower horizontal member for receiving pipes of various diameter sizes therebetween. The lower horizontal member is rigidly attached to a lower end portion of the upright member. The side adjusting means includes a hollow end sleeve rigidly attached with and extending in a substantially perpendicular relation to the upper horizontal member. The hollow end sleeve is slidably movably fitted over and along the upright member of the grip assembly. The side adjusting means also includes side means for fastening the hollow end sleeve to the upright member at a desired location therealong for securing the upper horizontal member in a desired position over the top of the second pipe relative to the lower horizontal member.

The actuator assembly further includes upper means for adjusting the horizontal distance between the pair of vertical side members for receiving pipes of various diameter sizes therebetween. The upper adjusting means includes a hollow sleeve slidably movable over and along the handle of the actuator assembly, a pair of inverted L-shaped hollow corner sleeves each slidably movable over and along one of a pair of opposite lateral ends of the top horizontal member and over and along a top end of a respective one of the vertical side members, and a pair of opposite yoke links each extending between and being pivotally attached to the hollow sleeve at opposite sides thereof and to a top side of a respective one of the inverted L-shaped hollow corner sleeves. The upper adjusting means also includes means for fastening the hollow sleeve to the handle of the actuator assembly at a desired location therealong for securing the vertical side members in desired positions along the sides of the first pipe.

The actuator assembly additionally includes lower means for adjusting the height of the top horizontal member along and relative to the vertical side members for receiving pipes of various diameter sizes thereunder. The lower adjusting means includes the pair of inverted L-shaped hollow corner sleeves slidably movable over and along the top ends of the respective vertical side members of the actuator assembly. The lower adjusting means also includes a pair of right and left means for fastening each of the inverted L-shaped hollow corner sleeves to one of the vertical side members of the actuator assembly for securing the top horizontal member at the desired height over the top of the first pipe.

The link means includes an elongated link member defining the one end and opposite end thereof. The one end of the link member is pivotally connected to the upper horizontal member of the gripping assembly. The opposite end of the elongated link member is pivotally connected to the hollow sleeve of the upper adjusting means of the actuator assembly below the pivotal connection of the yoke links thereto.

Further, the handle of the actuator assembly includes a lower main tubular member fixedly attached to and extending upwardly from the top horizontal member of the lower yoke, and an upper extension member received telescopically in the main tubular member and extendable upwardly therefrom to provide leverage by pulling on the upper extension member. The handle also includes means for releasably fastening the extension member to the main tubular member so that the extension member extends a desired height above the main tubular member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a pipeline assembling apparatus of the present invention showing the first and second pipes to be assembled in phantom.

FIG. 2 is an enlarged sectional view of a fastening means of the apparatus taken along line 2—2 of FIG. 1.

FIG. 3 is an enlarged detailed view, partly in section, of a tab and hollow sleeve of the fastening means as seen along line 3—3 of FIG. 2.

FIG. 4 is a side elevational view of the apparatus, being shown on a reduced scale, with the first and second pipes shown in an unassembled condition and the apparatus shown in an initial starting position for pulling the second pipe into the first pipe.

FIG. 5 is the same view of the apparatus as shown in FIG. 4 but showing the first and second pipes in an assembled condition after the apparatus has been actuated from the initial starting position of FIG. 4 to a final finished position of FIG. 5.

FIG. 6 is an enlarged detailed view of the area of the apparatus enclosed by circle 6 of FIG. 4 showing a hollow sleeve and upright member partially cut away so as to partially show the connection of a link member of the apparatus to an upper horizontal member of a gripper assembly of the apparatus.

FIG. 7 is an enlarged fragmentary rear elevational view of an actuator assembly of the apparatus.

FIG. 8 is an enlarged fragmentary rear elevational view of the gripper assembly of the pipeline assembly apparatus showing the second pipe in cross-section.

DETAILED DESCRIPTION OF THE INVENTION

Referring to the drawings and particularly to FIGS. 1, 4 and 5, there is illustrated a pipeline assembling apparatus, generally designated 10, of the present invention which is adapted to provide sufficient leverage to force two pipes F, S together in the assembling of a pipeline. The pipeline assembling apparatus 10 is particularly intended for use with large diameter pipes such as those made of PVC and used in the installation of water mains and gas or sewer lines.

Basically, the pipeline assembling apparatus 10 includes a gripper assembly 12, an actuator assembly 14 spaced from the gripper assembly 12, and link means 16 extending between and pivotally interconnecting the gripper assembly 12 and actuator assembly 14. An operator using the apparatus 10 will normally stand adjacent to and to the left of the actuator assembly 14 of the apparatus 10, as viewed in FIGS. 4 and 5, for actuating the apparatus 10 to insert the end E of the second pipe S into the end E of the first pipe F.

Referring now to FIGS. 1 to 6 and 8, the gripper assembly 12 of the apparatus 10 includes an upright member 18 for placement adjacent a side of the end E of the second pipe S to be inserted into the adjacent end E of the first pipe F, and a pair of upper and lower horizontal members 20, 22 disposed adjacent to the upright member 18 and extending in cantilevered fashion outwardly therefrom and generally parallel to one another for placement respectively above and below the end E of the second pipe S. The lower horizontal member 22 is rigidly attached to and extends substantially perpendicular from a lower end portion 18A of the upright member 18.

The gripper assembly 12 further includes side means 24 for adjusting the height of the upper horizontal member 20 relative to and above the lower horizontal member 22 for receiving pipes of various diameter sizes therebetween. The side adjusting means 24 includes a vertically-disposed hollow end sleeve 26 rigidly connected to the upper horizontal member 20 and extending substantially perpendicular therefrom and slidably movable over and along the upright member 18. The vertical hollow end sleeve 26 has a width slightly greater than a width of the upright member 18 for interfitting therewith. Upward movement of the vertical hollow end sleeve 26 causes the upper horizontal member 20 to ascend and to thereby increase the height of the upper horizontal member 20 above the lower horizontal member 22. Conversely, downward movement of the vertical hollow end sleeve 26 causes the upper horizontal member 20 to descend and to thereby decrease the height of the upper horizontal member 20 above the lower horizontal member 22. The lengths of the upper and lower horizontal members 20, 22 are furthermore substantially similar while the length of the upright member 18 is greater than the lengths of the upper and lower horizontal members 20, 22 so as to permit sufficient flexibility in the adjustment of the distance between the upper and lower horizontal members 20, 22 for receiving pipes of various diameter sizes therebetween.

Referring particularly to FIGS. 2 and 3, the gripper assembly 12 also has side means 28 for fastening the vertical hollow end sleeve 26 of the side adjusting means 24 at a desired location along the upright member 18 for securing the upper horizontal member 20 in a desired position over the top of the second pipe S relative to the lower horizontal member 22. The side fastening means 28 includes a lever 30 having a cam portion 32 thereon and being pivotally attached to the opposite sides of and supported adjacent to a side of the vertical hollow end sleeve 26, and a tab 34 cut out of the same side of the vertical hollow end sleeve 26 adjacent to the cam portion 32 of the lever 30. The pivotal attachment of the lever 30 to the vertical hollow end sleeve 26 includes a pair of spaced ears 36 attached to and extending outwardly beyond opposite sides of the vertical hollow end sleeve 26, and a pin 38 passing through a central bore 40 in the cam portion 32 of the lever 30 and extending between and being attached to the opposite ears 36.

The lever 30 is pivotally movable relative to the hollow end sleeve 26 between a clamped position, as shown in solid line form in FIG. 2, and an unclamped position, as shown in dashed line form in FIG. 2, and, in response thereto, the cam portion 32 correspondingly moves relative to the tab 34 between an extended position, as shown in solid line form in FIG. 2, and a retracted position, as shown in dashed line form in FIG. 2. Finally, in response thereto, the tab 34 is thereby correspondingly moved relative to the upright member 18 between an engaged position in which the tab 34 is deflected into the end sleeve 26 as seen in FIG. 2, and a disengaged position in which the tab 34 extends within the plane of the side wall of the end sleeve 26. The tab 34 in the engaged position has the effect of stationarily fastening the hollow end sleeve 26 to the upright member 18 and in the disengaged position has the effect of permitting the hollow end sleeve 26 to freely slide over and relative to the upright member 18.

Referring now to FIGS. 1 to 5 and 7, the actuator assembly 14 of the apparatus 10 includes a lower yoke 42 of an inverted U-shape formed by a top horizontal member 44 and a pair of vertical side members 46 for placement over the end E of the first pipe F, and a handle 48 fixedly attached to the top horizontal member 44 of the lower yoke 42. The handle 48 includes a lower main tubular member 48A fixedly attached to and extending upwardly from the center of the top horizontal member 44 of the lower yoke 42 and an upper extension member 48B received telescopically in the main tubular member 48A and extendable upwardly therefrom to provide leverage by the operator pulling on the upper extension member 48B. The upper extension member 48B of the handle 48 has an upper end portion 48C being bent at an angle relative thereto for gripping by the operator. The handle 48 also includes a means 49 for releasably fastening the upper extension member 48B to the lower main tubular member 48A at a desired location therealong so that the upper extension member 48B can extend a desired height above the main tubular member 48A. The fastening means 49 includes a lever 51 having a cam portion thereon and being pivotally attached by a pair of ears to the lower main tubular member 48A and supported adjacent to a side thereof, and a tab cut out of the main tubular member 48A adjacent to the cam portion of the lever 51. The arrangement of and the clamping and unclamping operation of the fastening means 49 with respect to the main tubular member 48A is substantially the same as that described above with reference to the side fastening means 28 of the gripper assembly 12 and thus need not be repeated again.

The actuator assembly 14 further has a means 50 for adjusting the horizontal distance between the pair of vertical side members 46 for receiving pipes of various diameter sizes therebetween. The upper adjusting means 50 includes a vertical hollow sleeve 52 slidably movable over and along the lower main tubular member 48A of the handle 48, a pair of inverted L-shaped hollow corner sleeves 54 slidably movable over and along each of the opposite lateral ends of the top horizontal member 44 and over and along a top end of each of the vertical side members 46, and a pair of opposite yoke links 56 each extending between and being pivotally attached to the vertical hollow sleeve 52 at opposite sides thereof and to a top side of one of the inverted L-shaped hollow corner sleeves 54. The pivotal attachment at each end of each yoke link 56 includes a pair of opposite ears 58 attached to and extending outwardly in substantially perpendicular relation to one of the opposite sides of the vertical hollow sleeve 52 and to the top side of one of the inverted L-shaped hollow corner sleeves 54, and a pin 60 passing through the upper end of each yoke link 56 and extending between and being attached to the opposite ears 58.

The vertical hollow sleeve 52 has a width slightly greater than a width of the lower main tubular member 48A of the handle 48 for interfitting therewith. Each inverted L-shaped hollow corner sleeve 54 has a width slightly greater than the width of each lateral end of the top horizontal member 44 and also slightly greater than a width of the respective vertical side member 46 for interfitting therewith. Each inverted L-shaped hollow corner sleeve 54 further has a length which is greater over and along the vertical side member 46 than over and along the lateral end of the top horizontal member 44.

Upward movement of the vertical hollow sleeve 52 causes each of the yoke links 56 to pull the inverted L-shaped hollow corner sleeves 54 inwardly so as to shorten the horizontal distance between the vertical side members 46. Conversely, downward movement of the vertical hollow sleeve 52 causes each of the yoke links 56 to push the inverted L-shaped hollow corner sleeves 54 outwardly so as to lengthen the horizontal distance between the vertical side members 46. The opposite ends of upper horizontal portions 54A of the hollow corners sleeves 54 are open and the lower ends of the yoke links 56 are removably attached to the lower yoke mounting ears 58, such as by suitable snap button latching members (not shown), mounted to the upper horizontal portions 54A of the hollow corner sleeves 54 so that when the attachment to the ears 58 is released the corner sleeves 54 can be rotated 180° with respect to the opposite end portions of the top horizontal member 44. Then, the yoke mounting ears 58 can be reattached to the lower ends of the yoke links 56. Now lower vertical portions 54B of the corner sleeves 54 will be located closer to one another. This feature adapts the lower yoke 42 to fit over first pipes F of a wide range of different smaller diameters.

Preferably, the length of each vertical side member 46 is substantially the same as the length of the top horizontal member 44 while the length of the handle 48 is adjustable to be greater than the length of each vertical side member 46 and the top horizontal member 44 so as to provide the operator or user with sufficient leverage to pull on the handle 48. The opposite yoke links 56 each further have a length substantially smaller than that of the handle 48, the vertical side members 46, or the top horizontal member 44.

The actuator assembly 14 also has a means 62 for fastening the vertical hollow sleeve 52 to the lower main tubular member 48A of the handle 48 at a desired location therealong for securing the vertical side members 46 at the desired horizontal distance apart and in desired positions along the sides of the first pipe F. The fastening means 62 includes a lever 64 having a cam portion thereon and being pivotally attached by a pair of ears 66 to the vertical hollow sleeve 52 and supported adjacent to a side thereof, and a tab cut out of the vertical hollow sleeve 52 adjacent to the cam portion of the lever 64. The arrangement of and the clamping and unclamping operation of the fastening means 62 with respect to the vertical hollow sleeve 52 is substantially the same as that described above with reference to the side fastening means 28 of the gripper assembly 12 and thus need not be repeated again.

The actuator assembly 14 further has lower means 68 for adjusting the height of the top horizontal member 44 relative to the vertical side members 46 for receiving pipes of various diameter sizes thereunder. The lower adjusting means 68 includes the inverted L-shaped hollow corner sleeves 54. Extending the respective vertical side members 46 from the corner sleeves 54 causes the top horizontal member 44 to ascend and thereby increase the height of the lower yoke 42. Conversely, retracting the respective vertical side members 46 into the corner sleeves 54 causes the top horizontal member 44 to descend and thereby decrease the height of the lower yoke 42.

The actuator assembly 14 also has lower right and left means 70 for fastening each of the inverted L-shaped hollow corner sleeves 54 of the lower adjusting means 68 to one of the vertical side members 46 for securing the top horizontal member 44 at the desired height over the top of the first pipe F. Each of the lower right and left fastening means 70 includes a series of vertically spaced apertures 72 formed in the lower vertical portion 54B of the respective one of the corner sleeves 54 and a snap button latching member 74 mounted in a known manner within the respective one of the vertical side members 46 projecting through an aperture 75 therein and being releasably fitted through a selected one of the apertures 72 to retain the corner sleeve 54 at the desired position along the vertical side member 46.

Referring now to FIGS. 1 to 6, the link means 16 of the apparatus 10 includes an elongated link member 76 extending between and pivotally connected at one end 76A to the upper horizontal member 20 of the gripper assembly 12 and at an opposite end 76B to the vertical hollow sleeve 52 slidably mounted to the lower main tubular member 48A of the handle 48. The pivotal attachment at the one end 76A of the link member 76 includes a pair of opposite ears 82 attached to and extending outwardly in substantially perpendicular relation to the top side of the upper horizontal member 20, and a pin 84 passing through the one end 76A of the link member 76 and extending between and being attached to the opposite ears 82. The pivotal attachment at the opposite end 76B of the link member 76 includes a pair of opposite ears 86 attached to and extending beyond the vertical hollow sleeve 52 and a pin 88 passing through the opposite end 76B of the link member 76 and extending between and being attached to the opposite ears 86. The link member 76 further preferably has a length which is substantially greater than that of any other member of the apparatus 10.

Thus, upward movement of the vertical hollow sleeve 52 relative to the handle 48 causes the opposite end 76B of the link member 76 to ascend. Conversely, downward movement of the vertical hollow sleeve 52 causes the opposite end 76B of the link member 76 to descend. The upward and downward adjusting movements of the link member 76 occurs with the vertical adjustment of the upper adjusting means 50 of the apparatus 10. By the operator manually pulling on the upper extension member 48B of the handle 48 in a direction away from the second pipe S, the end E of the second pipe S is gripped between the upper and lower horizontal members 20, 22 of the gripper assembly 12 and the second pipe S is pulled with the gripper assembly 12 toward and guidably inserted into the adjacent stationary end E of the first pipe F.

Referring now particularly to FIGS. 1 and 8, the upper horizontal member 20 of the gripper assembly 12 further has a grip pad 96 made of a suitable rigid material, such as steel, attached on the sides thereof and centered therealong for providing a gripping surface upon the upper horizontal member 20 for gripping the end E of the second pipe S upon pulling on the upper extension member 48B of the handle 48 of the actuator assembly 14 in the direction away from the second pipe S.

Referring now particularly to FIGS. 1, 4 and 5, each of the vertical side members 46 of the lower yoke 42 of the actuator assembly 14 optionally can have a spike-shaped lower end 46A for penetrating the ground surface when necessary and thereby providing leverage for pulling the handle 48 of the actuator assembly 20 in the direction away from the second pipe S. Each spike-shaped lower end 46A is angled upwardly and outwardly from a lower end point at one side of the vertical side members 46 to an opposite side thereof.

Finally, operation of the pipeline assembling apparatus 10 basically involves placing the gripper assembly 12 around the second pipe S and placing the yoke 42 of the actuator assembly 14 over the first pipe F. A pulling force is then manually applied by an operator to the upper extension member 48B of the handle 48 of the actuator assembly 14 which thereby causes the gripper assembly 12 to pivot slightly relative to the second pipe S to the position shown in FIG. 5 until it grips the second pipe S which is to be inserted into the first pipe F, and then to guide the second pipe S into the first pipe F. The handle, sleeves and members of the pipeline assembling apparatus 10 are each made of rigid tubes preferably having a rectangular cross-section.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A pipeline assembling apparatus for use in assembling together large diameter pipes, said apparatus comprising:
   (a) a gripper assembly including an upright member for placement adjacent to a side of an end of a second pipe to be inserted into an adjacent end of a first pipe, and a pair of upper and lower horizontal members extending in a cantilevered manner outwardly from said upright member and generally parallel to one another for placement respectively above and below the end of the second pipe;
   (b) an actuator assembly spaced from said gripper assembly and including a lower yoke of an inverted U-shape formed by a top horizontal member and a pair of vertical side members for placement over the end of the first pipe, and a handle fixedly attached to said top horizontal member of said lower yoke; and
   (c) link means extending between and pivotally connected at one end to said upper horizontal member of said gripper assembly and at an opposite end to said handle of said actuator assembly such that by manually pulling on said handle in a direction away from the second pipe the end of the second pipe is gripped between said upper and lower horizontal members of said gripper assembly and the second pipe is pulled with said gripper assembly toward and guidably inserted into the adjacent stationary end of the first pipe.

2. The apparatus of claim 1 wherein said lower horizontal member of said gripper assembly is rigidly attached to a lower end portion of said upright member.

3. The apparatus of claim 1 wherein said gripper assembly further includes side means for adjusting the height of said upper horizontal member along said upright member and relative to said lower horizontal member for receiving pipes of various diameter sizes therebetween.

4. The apparatus of claim 3 wherein said side adjusting means includes a hollow end sleeve rigidly attached with and extending in a substantially perpendicular relationship to said upper horizontal member, said hollow end sleeve also slidably fitted over and movable along said upright member of said gripper assembly for adjusting said height of said upper horizontal member along said upright member and relative to said lower horizontal member.

5. The apparatus of claim 4 wherein said side adjusting means further includes side means for fastening said hollow end sleeve to said upright member at a desired location therealong for securing said upper horizontal member in a desired position over the top of the second pipe relative to said lower horizontal member.

6. The apparatus of claim 5 wherein said side fastening means includes:
   a lever having a cam portion thereon pivotally attached to said hollow end sleeve; and
   a tab cut from said hollow end sleeve adjacent to said cam portion of said lever, said lever being movable between a clamped position and an unclamped position relative to said hollow end sleeve and, in response thereto, said cam portion thereby being correspondingly moved between an extended position and a retracted position relative to said tab and, in response thereto, said tab thereby being correspondingly moved between an engaged position and a disengaged position relative to said upright member, said tab in said engaged position having the effect of stationarily fastening said hollow end sleeve to said upright member and in said disengaged position having the effect of permitting said hollow end sleeve to slide over and relative to said upright member.

7. The apparatus of claim 1 wherein said actuator assembly further includes upper means for adjusting the horizontal distance between said pair of vertical side members for receiving pipes of various diameter sizes therebetween.

8. The apparatus of claim 7 wherein said upper adjusting means includes:
   a hollow sleeve slidably movable over and along said handle of said actuator assembly;
   a pair of inverted L-shaped hollow corner sleeves each slidably movable over and along one of a pair of opposite ends of said top horizontal member and over and along a top end of one of said vertical side members; and
   a pair of opposite yoke links each extending between and being pivotally attached to said hollow sleeve at opposite sides thereof and to a top side of one of said inverted L-shaped hollow corner sleeves such that upward movement of said hollow sleeve causes each of said yoke links to pull said inverted L-shaped hollow corner sleeves inwardly so as to shorten the distance between said vertical side members whereas downward movement of said hollow sleeve causes each of said yoke links to push said inverted L-shaped hollow corner sleeves outwardly so as to lengthen the distance between said vertical side members.

9. The apparatus of claim 8 wherein said upper adjusting means also includes means for fastening said hollow sleeve to said handle of said actuator assembly at a desired location along side handle for securing said vertical side members at the desired horizontal distance apart and in desired positions along the sides of the first pipe.

10. The apparatus of claim 9 wherein said fastening means includes:
    a lever having a cam portion thereon pivotally attached to said hollow sleeve; and
    a tab cut from said hollow sleeve adjacent to said cam portion of said lever, said lever being movable between a clamped position and an unclamped position relative to said hollow sleeve and, in response thereto, said cam portion being correspondingly moved between an extended position and a retracted position relative to said tab and, in response thereto, said tab being correspondingly moved between an engaged position and a disengaged position relative to said handle, said tab in said engaged position having the effect of stationarily fastening said hollow sleeve to said handle and in said disengaged position having the effect of permitting said hollow sleeve to slide over and relative to said handle.

11. The apparatus of claim 1 wherein said actuator assembly further includes lower means for adjusting the height of said top horizontal member along and relative to said vertical side members for receiving pipes of various diameter sizes thereunder.

12. The apparatus of claim 11 wherein said lower adjusting means includes a pair of inverted L-shaped hollow corner sleeves each having an upper horizontal portion slidably movable over and along one of a pair of opposite ends of said top horizontal member and over and a lower vertical portion movable over and along a top end of one of said vertical side members such that upward movement of each of said inverted L-shaped hollow corner sleeves relative to a respective one of said vertical side members causes said top horizontal member to ascend and thereby increase the height of said lower yoke whereas downward movement of each of said inverted L-shaped hollow corner sleeve relative to said respective one of said vertical side members causes said top horizontal member to descend and thereby decrease the height of said lower yoke.

13. The apparatus of claim 12 wherein said lower adjusting means also includes right and left means for fastening each of said inverted L-shaped hollow corner sleeves to said respective one of said vertical side members of said actuator assembly for securing said top horizontal member at the desired height over the top of the first pipe.

14. The apparatus of claim 13 wherein each of said right and left fastening means includes:
    means defining a series of vertically spaced apertures in said lower vertical portion of a respective one of said corner sleeves;
    means defining an aperture in a respective one of said vertical side members; and
    a snap button latching member disposed within said respective vertical side member and projecting through said aperture therein to releasably fit through a selected one of said vertically spaced apertures so as to retain said corner sleeve at a desired position along said respective vertical side member.

15. The apparatus of claim 8 wherein said link means includes an elongated link member defining said one end and opposite end of said link means, said link member at said one end being pivotally connected to said upper horizontal member of said gripper assembly and at said opposite end being pivotally connected to said hollow sleeve of said upper adjusting means of said actuator assembly.

16. The apparatus of claim 1 wherein said handle of said actuator assembly includes:
    a lower main tubular member fixedly attached to and extending upwardly from said top horizontal member of said lower yoke; and
    an upper extension member received telescopically in said main tubular member and extendable upwardly therefrom to provide leverage by pulling on said upper extension member.

17. The apparatus of claim 16 wherein said handle also includes means for releasably fastening said upper extension member to said lower main tubular member so that said upper extension member extends a desired height above said lower main tubular member.

18. The apparatus of claim 17 wherein said fastening means includes:

a lever having a cam portion thereon pivotally attached to said lower main tubular member; and a tab cut from said lower main tubular member adjacent to said cam portion of said lever, said lever being movable between a clamped position and an unclamped position relative to said lower main tubular member and, in response thereto, said cam portion thereby being correspondingly moved between an extended position and a retracted position relative to said tab and, in response thereto, said tab thereby being correspondingly moved between an engaged position and a disengaged position relative to said upper extension member, said tab in said engaged position having the effect of stationarily fastening said upper extension member to said lower main tubular member and in said disengaged position having the effect of permitting said upper extension member to slide over and relative to said lower main tubular member.

19. The apparatus of claim 1 wherein said upper horizontal member of said gripper assembly has a grip pad attached on opposite sides of said upper horizontal member and extending around a bottom thereof for providing a gripping surface upon said upper horizontal member.

20. The apparatus of claim 1 wherein each of said vertical side members of said lower yoke of said actuator assembly has a spike-shaped lower end for penetrating the ground surface and thereby providing leverage for pulling said handle of said actuator assembly in a direction away from the second pipe and further pulling the second pipe toward and guidably into the stationary end of the first pipe.

* * * * *